United States Patent
Kim et al.

(10) Patent No.: US 9,643,846 B2
(45) Date of Patent: May 9, 2017

(54) RECYCLING METHOD OF OLIVINE-BASED CATHODE MATERIAL FOR LITHIUM SECONDARY BATTERY, CATHODE MATERIAL FABRICATED THEREFROM, AND CATHODE AND LITHIUM SECONDARY BATTERY INCLUDING THE SAME

(71) Applicant: KOREA INSTITUTE OF SCIENCE AND TECHNOLOGY, Seoul (KR)

(72) Inventors: Hyung Sun Kim, Seoul (KR); Byung Won Cho, Seoul (KR); Hwa Young Lee, Seoul (KR); Eun Jung Shin, Gyeonggi-Do (KR); Soo Kim, Daejeon (KR); Kyung Yoon Chung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 669 days.

(21) Appl. No.: 13/944,457

(22) Filed: Jul. 17, 2013

(65) Prior Publication Data
US 2014/0264185 A1    Sep. 18, 2014

(30) Foreign Application Priority Data

Mar. 14, 2013  (KR) .................. 10-2013-0027039

(51) Int. Cl.
*H01M 4/88* (2006.01)
*C01B 25/45* (2006.01)
(Continued)

(52) U.S. Cl.
CPC ............ *C01B 25/45* (2013.01); *C01B 25/375* (2013.01); *H01M 4/5825* (2013.01); *H01M 10/54* (2013.01); *Y02W 30/84* (2015.05)

(58) Field of Classification Search
CPC ... Y02E 60/122; H01M 4/485; H01M 4/5825; C01B 25/45; C01B 25/30
(Continued)

(56) References Cited

U.S. PATENT DOCUMENTS

| 2013/0313485 A1* | 11/2013 | Kim ................... C01B 25/45 252/506 |
| 2014/0227153 A1* | 8/2014 | Laucournet ............. C22B 7/006 423/141 |

FOREIGN PATENT DOCUMENTS

| CN | 101383441 A * | 3/2011 | ............... B09B 3/00 |
| CN | 101916889 A * | 12/2015 | ............ H01M 10/54 |

(Continued)

OTHER PUBLICATIONS

Zaghib et al., "Structure and electrochemistry of FePO4.2H2O hydrate", Journal of Power Sources 142 (2005) pp. 279-284.*

(Continued)

*Primary Examiner* — Khanh Tuan Nguyen
(74) *Attorney, Agent, or Firm* — Ladas & Parry LLP

(57) ABSTRACT

The present invention relates to a method for recycling $LiFePO_4$, which is an olivine-based cathode material for a lithium secondary battery. The present invention is characterized in that a cathode material including $LiFePO_4$ is synthesized using, as precursors, amorphous $FePO_4 \cdot XH_2O$ and crystalline $FePO_4 \cdot 2H_2O$ (metastrengite) obtained by chemically treating $LiFePO_4$ as an olivine-based cathode material for a lithium secondary battery, which is produced from a waste battery. Since a cathode fabricated from the $LiFePO_4$ cathode material synthesized according to the present invention does not deteriorate the capacity, output characteristics, cycle efficiency and performance of the (Continued)

secondary battery and the cathode material of the lithium secondary battery may be recycled, the secondary battery is economically efficient.

18 Claims, 7 Drawing Sheets

(51) Int. Cl.
  *C01B 25/37* (2006.01)
  *H01M 10/54* (2006.01)
  *H01M 4/58* (2010.01)
(58) Field of Classification Search
  USPC ......... 252/506; 205/538, 557, 560; 423/141; 29/631.1
  See application file for complete search history.

(56) References Cited

FOREIGN PATENT DOCUMENTS

| KR | 1020080018734 A | 2/2008 |
| KR | 1020120030865 A | 3/2012 |

OTHER PUBLICATIONS

Scaccia et al., "Morphological investigation of sub-micron FePO4 and LiFePO4 particles for rechargeable lithium batteries", Materials Research Bulletin 38 (2003) pp. 1155-1163.*
Son et al., "Nanoparticles iron-phosphate anode material for Li-ion battery", Applied Physics Letter, vol. 85, No. 24, (2004) pp. 5875-5877.*

* cited by examiner

RECYCLING METHOD OF OLIVINE-BASED CATHODE MATERIAL FOR LITHIUM SECONDARY BATTERY, CATHODE MATERIAL FABRICATED THEREFROM, AND CATHODE AND LITHIUM SECONDARY BATTERY INCLUDING THE SAME

CROSS-REFERENCE TO RELATED APPLICATION

This application claims priority to and the benefit of Korean Patent Application No. 2013-0027039, filed on Mar. 14, 2013, the disclosure of which is incorporated herein by reference in its entirety.

BACKGROUND

1. Field of the Invention

The present invention relates to a recycling method of an olivine-based cathode material for a lithium secondary battery, a cathode material fabricated therefrom, and a cathode and a lithium secondary battery including the same. More particularly, the present invention relates to a method for synthesizing a cathode material including $LiFePO_4$ by chemically treating lithium secondary battery cathode scraps including $LiFePO_4$ to synthesize amorphous $FePO_4 \cdot XH_2O$ and crystalline $FePO_4 \cdot 2H_2O$ (metastrengite), and then using the synthesized crystalline $FePO_4 \cdot 2H_2O$ (metastrengite). The present invention also relates to a cathode material fabricated therefrom, a cathode and a lithium secondary battery including the same.

2. Discussion of Related Art

A lithium secondary battery is a secondary battery having excellent performances, such as high capacity, high output, long service life, and the like, and is widely used in small electronic products such as electronic devices, laptops, cell phones, and the like. In particular, as interests in green growth and new renewable energy such as solar energy, wind power, and the like have recently increased, a need for a large-capacity lithium secondary battery for an electric vehicle, an energy storage system, and the like is expected to sharply increase.

As a cathode material for a lithium secondary battery, various kinds of materials have been developed, and along with $LiCoO_2$, a ternary cathode material ($LiCo_{1/3}Ni_{1/3}Mn_{1/3}O_2$) and the like in the related art, recently, a $LiFePO_4$ cathode material that is an olivine-based material has been recently highlighted as a large-capacity lithium secondary battery for an electric vehicle and an energy storage system. In particular, since the $LiFePO_4$ cathode material is cheaper than other cathode materials, the commercialization of a large-capacity lithium secondary battery using $LiFePO_4$ as a cathode material is expected to be within reach in the near future.

As described above, the lithium secondary battery market and industry are expected to sharply increase, but lithium (Li) as an essential metal of the cathode material or related compounds are not found in Korea, and thus are entirely imported from other countries and used. Therefore, in countries having no natural resources such as Korea, it is necessary to recover and recycle cathode material scraps produced in a manufacturing process of a lithium secondary battery, or lithium secondary battery cathode materials disposed of after use.

As a method of extracting or recovering various metals such as lithium and the like or compounds from a lithium secondary battery cathode material in the related art, a process of recovering a cathode material by dissolving the cathode material separated from a waste lithium battery in a strong acid such as hydrochloric acid (HCl), sulfuric acid ($H_2SO_4$), nitric acid ($HNO_3$), or the like, then neutralizing the resulting solution with an alkali, and precipitating cobalt (Co), nickel (Ni) and the like with hydroxide is used, or a method of separating a metal such as cobalt, manganese, nickel, and the like from a liquid in which the cathode material is dissolved by a solvent extraction method is used.

As described above, in the method of treating a cathode material in the related art, while it is an object to recover heavy metals such as cobalt, nickel, and the like, there is not much of an interest in lithium because lithium is cheaper than cobalt and nickel. However, lithium and related resources are very limited and a large-capacity lithium secondary battery for an electric vehicle and an energy storage system is likely to use a phosphate-based $LiFePO_4$ which does not include cobalt or nickel as a cathode material, and thus more concentration will likely be placed on the recovery or recycling of lithium or related compounds in the future.

CITATION LIST

Patent Document (Patent Document 1) 1. Korean Patent Application Laid-Open No. 10-2012-0030865
(Patent Document 2) 2. Korean Patent Application Laid-Open No. 10-2008-0018734

SUMMARY OF THE INVENTION

The present invention is directed to a recycling method of an olivine-based cathode material for a lithium secondary battery, a cathode material fabricated therefrom, and a cathode and a lithium secondary battery including the same. That is, the present invention is directed to a method capable of recycling cathode material scraps including $LiFePO_4$, which are produced during a manufacturing process of a battery, or a phosphate-based lithium secondary battery cathode material including $LiFePO_4$, which is included in a waste battery, through a chemical treatment.

Also, the present invention is directed to a method of synthesizing crystalline $FePO_4 \cdot 2H_2O$ (metastrengite) by recycling an olivine-based cathode material including $LiFePO_4$.

According to a first aspect of the present invention, there is provided a method for recycling an olivine-based cathode material for a lithium secondary battery, the method including: a first step of recovering a cathode material including $LiFePO_4$ from lithium secondary battery cathode scraps; a second step of synthesizing amorphous $FePO_4 \cdot XH_2O$ using the recovered cathode material; and a third step of synthesizing crystalline $FePO_4 \cdot 2H_2O$ (metastrengite) using the amorphous $FePO_4 \cdot XH_2O$.

The method may further include a fourth step of synthesizing a cathode material including $LiFePO_4$ using the crystalline $FePO_4 \cdot 2H_2O$ (metastrengite) after the third step.

In the first step, the cathode material may be recovered from the cathode scraps by subjecting the cathode scraps to heat treatment in an oxidizing atmosphere and then removing a current collector, and the heat treatment may be performed at a temperature of 300° C. to 500° C.

In the second step, amorphous $FePO_4 \cdot XH_2O$ is synthesized by dissolving the recovered cathode material in an acid and then injecting ammonia water thereinto to precipitate amorphous $FePO_4 \cdot XH_2O$, and the amorphous $FePO_4 \cdot XH_2O$ may be separated through a filtration process. Specifically, the second step may be performed by adding ammonia water thereto to adjust the solution to a pH of 5 to 6 and maintaining the solution at 20° C. to 70° C. for 1 to 12 hours. Before the recovered cathode material is dissolved in the acid, Fe present in the cathode material may be oxidized by subjecting the recovered cathode material to heat treatment, and the heat treatment temperature may be 700° C. to 900° C. The acid may include one or more selected from the group consisting of nitric acid, hydrochloric acid, sulfuric acid, and a combination thereof.

In the third step, crystalline $FePO_4 \cdot 2H_2O$ (metastrengite) may be synthesized by treating amorphous $FePO_4 \cdot XH_2O$ with an acid solution having a pH of 1 to 2. The acid solution may include a phosphoric acid solution, and the concentration of the phosphoric acid solution may be 5 mol/l.

In the fourth step, the cathode material including $LiFePO_4$ may be synthesized by mixing a lithium source material and a carbon source material with the crystalline $FePO_4 \cdot 2H_2O$ (metastrengite) and subjecting the mixture to heat treatment. The heat treatment may be performed at 500° C. to 800° C. for 6 to 24 hours. Specifically, the crystalline $FePO_4 \cdot 2H_2O$ (metastrengite) and the lithium source material are mixed such that a molar ratio of Fe to Li is 1:1, and the heat treatment may be performed in a reducing atmosphere or inert atmosphere. The lithium source material may include one or more selected from the group consisting of $LiOH \cdot H_2O$, $Li_2CO_3$, $LiCl$, $Li_3PO_4$, and a combination thereof, the carbon source material may include one or more selected from the group consisting of carbon black, acetylene black, sucrose, and a combination thereof, and the carbon source material may be added in an amount of 1 to 10% by weight based on a weight of the finally produced cathode material including $LiFePO_4$.

According to a second aspect of the present invention, there is provided an olivine-based cathode material for a lithium secondary battery, which is fabricated according to the first aspect of the present invention.

According to a third aspect of the present invention, there is provided an electrode for a lithium secondary battery including the cathode material of the second aspect of the present invention.

According to a fourth aspect of the present invention, there is provided a lithium secondary battery including the electrode of the third aspect of the present invention.

According to a fifth aspect of the present invention, there is provided crystalline $FePO_4 \cdot 2H_2O$ (metastrengite), which is fabricated according to the first aspect of the present invention.

According to the present invention, a cathode material for a lithium secondary battery may be fabricated by recovering $LiFePO_4$ cathode scraps produced during a manufacturing process of a lithium secondary battery, or $LiFePO_4$ cathode scraps included in a waste battery, and recycling the $LiFePO_4$ cathode scraps by a chemical treatment and a separation method. The lithium secondary battery may be manufactured in an environmentally friendly way without deterioration in performance, and the manufacturing costs may also be reduced.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
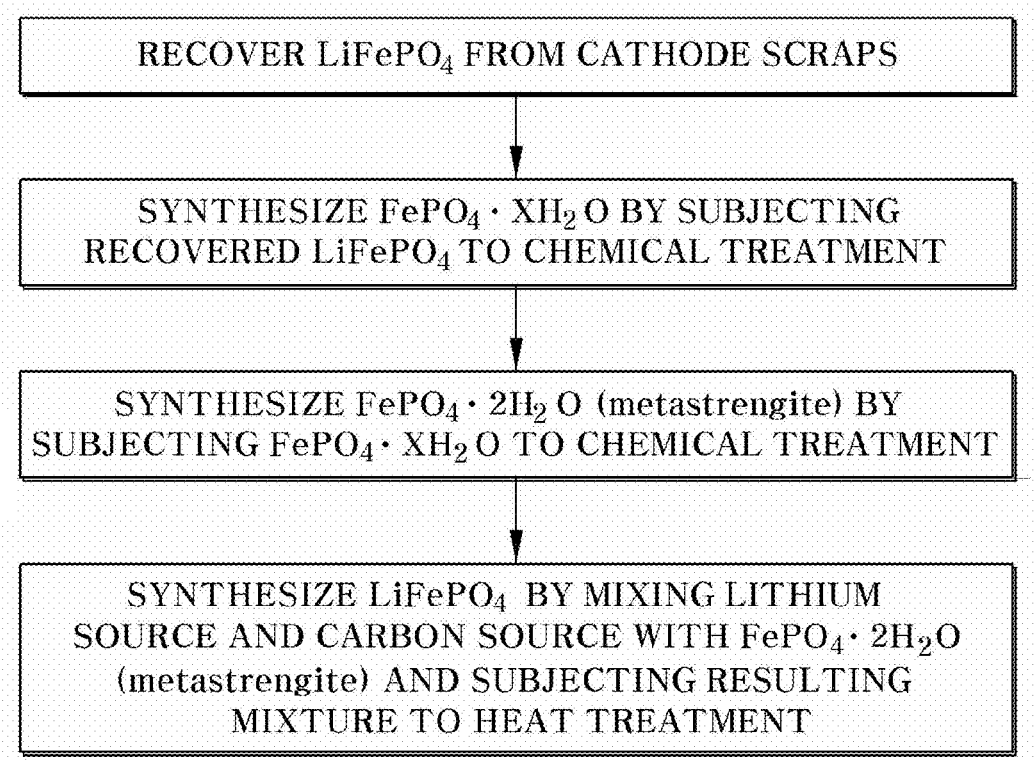
FIG. 1 is a process flowchart illustrating a method of recycling an olivine-based cathode material for a lithium secondary battery according to an embodiment of the present invention.

Hereinafter, exemplary embodiments of the present invention will be described in detail with reference to the accompanying drawings. Embodiments of the present invention may be modified in various forms, and the scope of the present invention is not limited to the embodiments which will be described below. In addition, embodiments of the present invention are provided to a person with ordinary skill in the art in order to describe the present invention more completely. Accordingly, the shape, the size and the like of elements illustrated in the drawings may be exaggerated for a more clear description, and elements represented by the same symbol in the drawings are the same elements.

FIG. 1 is a process flowchart illustrating a method of recycling an olivine-based cathode material for a lithium secondary battery according to a first embodiment of the present invention. Referring to FIG. 1, the first embodiment of the present invention may be a method for recycling an olivine-based cathode material for a lithium secondary battery, the method including: a first step of recovering a cathode material including $LiFePO_4$ from lithium secondary battery cathode scraps; a second step of synthesizing amorphous $FePO_4 \cdot XH_2O$ using the recovered cathode material; and a third step of synthesizing crystalline $FePO_4 \cdot 2H_2O$ (metastrengite) using the amorphous $FePO_4 \cdot XH_2O$.

The present embodiment relates to a method of recycling an olivine-based cathode material for a lithium secondary battery, and the olivine-based cathode material herein may include lithium iron phosphate ($LiFePO_4$). $FePO_4 \cdot 2H_2O$ (metastrengite) may be synthesized by recycling the olivine-based cathode material.

After the third step, the present embodiment may further include synthesizing a $LiFePO_4$ cathode material using crystalline $FePO_4 \cdot 2H_2O$ (metastrengite). In this case, an olivine-based cathode material including $LiFePO_4$ may be fabricated using $FePO_4 \cdot 2H_2O$ (metastrengite).

Hereinafter, the recycling process of the olivine-based cathode material according to the present embodiment will be reviewed in sequence.

First, cathode scraps for a lithium secondary battery (hereinafter referred to as "cathode scraps") may be prepared as follows.

The cathode for a lithium secondary battery may have a structure in which a cathode material layer is formed on a conductive metal thin plate. The conductive metal thin plate serves as a current collector, and is not particularly limited as long as the thin plate is a metal which may be conductive enough to serve as a current collector. Specifically, the thin plate is not particularly limited, but may be an aluminum thin plate.

The cathode material layer may include a cathode active material ($LiFePO_4$), a conductive agent, and a binder. Electrode reactions may occur in the cathode active material, electrons generated during the electrode reaction may be transferred to a current collector or an external circuit through the conductive agent, and the binder may bind cathode active material particles together to allow the shape to be maintained.

A cathode sheet may be manufactured by mixing the cathode active material, the conductive agent, and the binder in an organic solvent to prepare a slurry, coating the slurry on a conductive metal thin plate, and drying the slurry.

The cathode sheet for a lithium secondary battery may be cut into a desired shape and used as a cathode of the lithium secondary battery, and waste pieces generated during the cutting process may be collected to prepare cathode scraps.

Also, cathode scraps may be prepared by dissembling a lithium secondary battery which is disposed of after use.

Next, the cathode scraps may be subjected to heat treatment to carbonize the binder which is present in the cathode scraps.

The cathode scraps may include a conductive metal thin plate and a cathode material layer, and the cathode material layer may contain a binder. The binder is an organic polymer material, may be thermally decomposed at high temperature, remains in the form of carbon after the heat decomposition, and may serve as a conductive agent as in the case of carbon black. The cathode scraps may be subjected to heat treatment in order to carbonize the binder.

Since the binder is oxidized in an oxidizing atmosphere and fails to serve as a conductive agent, it is necessary to maintain the atmosphere during the heat treatment in an inert atmosphere or reducing atmosphere. Argon gas, nitrogen gas and the like may be used in order to form an inert atmosphere, and hydrogen gas may be used in order to form a reducing atmosphere.

The heat treatment temperature may be 300° C. to 500° C. When the heat treatment temperature is less than 300° C., the binder present in the cathode scraps may not be carbonized, and the current collector may not be separated from the cathode material layer. When the heat treatment temperature is more than 500° C., the phase change of the cathode active material ($LiFePO_4$) may occur, the performance of the battery may deteriorate due to an increase in crystallinity and particle diameter of the cathode active material, and a great deal of energy may be consumed, and thus the secondary battery may be economically inefficient.

The heat treatment time may be 1 to 3 hours. When the heat treatment time is less than 1 hour, the binder may not be carbonized, and when the heat treatment time is more than 3 hours, the performance of the battery may deteriorate due to occurrence of the phase change and increase in crystallinity and particle diameter of the cathode active material, and more energy may be consumed, and thus the secondary battery may be economically inefficient.

Through a heat treatment at an appropriate temperature, the binder may be carbonized and the aluminum current collector may be separated well from the cathode material layer without affecting the change in physical properties and the like of the cathode active material ($LiFePO_4$) itself.

Next, the cathode material may be recovered by separating the current collector from the thermally treated cathode scraps. Due to a difference in thermal expansion between a cathode material and a conductive metal thin plate used as a current collector, the conductive metal thin plate used as the current collector may be easily separated from the cathode material while undergoing the heat treatment process. The cathode material powder may be recovered by grinding the separated cathode material and sieving the material. A 200 mesh screen may be used in the sieving process.

Next, the recovered cathode material may be subjected to heat treatment in an oxidizing atmosphere. The heat treatment temperature may be 700° C. to 900 C. The temperature is maintained in order to oxidize Fe present in the cathode material to be dissolved well in acid. The heat treatment may also be performed in an air atmosphere. When the heat treatment temperature is less than 700° C., Fe may not be oxidized, and when the heat treatment temperature is more than 900° C., the structure of the $LiFePO_4$ cathode active material may be changed.

Next, amorphous $FePO_4 \cdot XH_2O$ may be synthesized by chemically treating the cathode material which has been thermally treated. $FePO_4$ may be precipitated by dissolving the oxidized cathode material in an acid and then injecting ammonia water thereinto. That is, the thermally treated $LiFePO_4$ cathode material is dissolved in a strong acid, such as hydrochloric acid, nitric acid, sulfuric acid, and the like to allow the resulting solution to be present as $Li^+$, $Fe^{+3}$, and $PO_4^{-3}$ ions, and then $FePO_4$ may be precipitated by adding ammonia water in order to separate $Fe^{+3}$ and $Li^+$ therefrom to adjust the pH to 5 to 6, and maintaining the temperature at 20° C. to 7° C. for 1 to 12 hours. A solid is obtained by filtering the obtained $FePO_4$ precipitate solution, and a purified amorphous $FePO_4 \cdot XH_2O$ powder may be obtained by washing and filtering the solid.

Conversely, purified LiCl may be prepared by subjecting the filtrate to an evaporation concentration process and a heat treatment process. Specifically, it is possible to obtain a solid in which $NH_4Cl$ and LiCl are mixed by the evaporation and concentration of the filtrate, and $NH_4Cl$ included in the solid exhibits a property that the compound is sublimated without being dissolved when heated to 337.8° C. or more, and thus $NH_4Cl$ crystals may be removed and a light gray LiCl salt may be obtained by performing heat treatment in an inert atmosphere at 350° C. to 700° C. for 1 to 12 hours.

Next, crystalline $FePO_4 \cdot 2H_2O$ (metastrengite) may be synthesized using amorphous $FePO_4 \cdot XH_2O$. Crystalline $FePO_4 \cdot 2H_2O$ (metastrengite) may be obtained by titrating the amorphous $FePO_4 \cdot XH_2O$ to a pH of 1 to 2 with a 5M phosphoric acid ($H_3PO_4$) solution while being stirred at a rate of 300 rpm at 95° C., and maintaining the system for 12 hours.

Next, a cathode material including $LiFePO_4$ may be fabricated using crystalline $FePO_4 \cdot 2H_2O$ (metastrengite).

The cathode material including $LiFePO_4$ may be fabricated by mixing a lithium source material with crystalline $FePO_4 \cdot 2H_2O$ (metastrengite) such that the molar ratio of Fe to Li is 1:1, and then subjecting the mixture to heat treatment in a partial reducing atmosphere or inert atmosphere. The lithium source material may include one or more selected from the group consisting of $LiOH \cdot H_2O$, $Li_2CO_3$, $LiCl$, $Li_3PO_4$, and a combination thereof. When the lithium source material is mixed with the crystalline $FePO_4 \cdot 2H_2O$ (metastrengite), a carbon source material may be additionally added thereto. The carbon source material may be weighed and mixed such that the material is present in an amount of 1 to 10% by weight based on $LiFePO_4$ to be finally produced. The carbon source is a material in which carbon remains after the thermal decomposition and is sufficient as long as the conductivity may be imparted to the cathode, and the material is not limited thereto, but specifically, the material may include one or more selected from the group consisting of carbon black, acetylene black, and sucrose. Argon gas, nitrogen gas and the like may be used in order to form an inert atmosphere, and hydrogen gas may be used in order to form a reducing atmosphere.

For example, a cathode material including $LiFePO_4$ may be fabricated by mixing $FePO_4 \cdot 2H_2O$ (metastrengite) with $LiOH \cdot H_2O$ such that the molar ratio of Fe to Li is 1:1, using a predetermined amount of distilled water in 6% sucrose as a carbon source material based on the entire amount of $LiFePO_4$ to prepare a uniformly mixed mixture, and then performing a heat treatment at a temperature of 500° C. to 800° C. in a partial reducing atmosphere (a mixture gas consisting of argon and 5% by mol of hydrogen) or an inert atmosphere for 6 to 12 hours. Specifically, the heat treatment may be performed at 700° C. for 8 hours.

The second embodiment of the present invention may be a cathode material for a lithium secondary battery, which is fabricated according to the first embodiment of the present invention.

The third embodiment of the present invention may be a cathode for a lithium secondary battery, which is fabricated using the cathode material of the second embodiment of the present invention.

A slurry is prepared by mixing 80 to 90% by weight of the cathode material, 5 to 10% by weight of the binder, and 5 to 10% by weight of the conductive agent and uniformly dispersing the mixture, and a cathode may be fabricated by coating the slurry on a conductive thin film using a doctor blade method.

As the cathode material, it is possible to use a cathode material including $LiFePO_4$ according to the second embodiment. The binder may be a water-based or organic-based binder. Specifically, although the binder is not limited thereto, it is possible to use a polymer solution in which sodium carboxymethyl cellulose (1% by weight in water) and styrene butadiene rubber (40% by weight in water) are mixed as the binder, and an N-methyl-pyrrolidinone (NMP) organic solvent and polyvinylidene fluoride (PVdF) may be used as the organic-based binder.

The conductive agent is not particularly limited as long as the agent may impart conductivity to the cathode, but specifically, carbon black (product name: Denka Black) or graphite (product name: KS6) may be used.

The conductive metal thin plate is not particularly limited as long as the thin plate has excellent electronic conductivity, and specifically, the thin plate may include one or more selected from the group consisting of an aluminum thin plate, a copper thin plate, a gold thin plate, a silver thin plate, and a platinum thin plate.

The viscosity of the slurry is appropriately 1,000 to 3,000 cps. In order to adjust the viscosity to this range, the NMP organic solvent may be added in an amount 2 to 3 times the weight of the mixture.

A homogenizer may be used in order to mix the slurry homogeneously, and may be stirred at a high rate of 5,000 rpm for 40 minutes.

A cathode for a lithium secondary battery may be fabricated by coating the slurry to a predetermined thickness, for example, 80 to 250 μm, on an aluminum current collector using a doctor blade method, and then drying the coating. Here, the thickness of the aluminum current collector may be 15 μm.

The fourth embodiment of the present invention may be a lithium secondary battery including the electrode of the third embodiment of the present invention. For example, a battery in the form of a CR2032 coin may be assembled using lithium metal as an anode and the cathode in the third embodiment as a cathode. As an electrolyte solution, it is possible to use an organic solvent electrolyte solution in which 1 M of $LiPF_6$ lithium salt is mixed with ethylene carbonate/diethyl carbonate/dimethyl carbonate in a volume ratio of 1:1:1.

Hereinafter, the present invention will be described in more detail with reference to Examples.

Example 1

$LiFePO_4$ cathode scraps collected during the process of fabricating a cathode for a lithium secondary battery were placed in a tubular furnace and subjected to heat treatment at a temperature of 300° C. in an air atmosphere for 3 hours to carbonize a binder, an aluminum current collector and a cathode material were separated well, and the separated cathode material was again subjected to heat treatment at a temperature of 700° C. in an air atmosphere for 6 hours, and dissolved in a hydrochloric acid solution.

In order to separate $Fe^{+3}$ and $Li^+$ of the $LiFePO_4$ cathode material dissolved in hydrochloric acid, ammonia water was added, pH was adjusted to 5.5, and the mixture was maintained at 60° C. for 3 hours to obtain a $FePO_4 \cdot XH_2O$ precipitate in an amorphous state.

The pH was titrated to 1.5 with a 5 M phosphoric acid solution while the $FePO_4 \cdot XH_2O$ precipitate in an amorphous state was stirred at a rate of 300 rpm at 95° C., and then the mixture was maintained for 12 hours to prepare crystalline $FePO_4 \cdot 2H_2O$ (metastrengite).

A cathode material including $LiFePO_4$ was fabricated by mixing the $FePO_4 \cdot 2H_2O$ (metastrengite) obtained in a condition of a pH of 1.5 in Example 1 with a $LiOH \cdot H_2O$ precursor such that the molar ratio of Fe to Li was 1:1, using a predetermined amount of distilled water in 6% sucrose as a carbon conductive agent based on the entire amount of $LiFePO_4$ to prepare a uniformly mixed mixture, and then performing a heat treatment at a temperature of 700° C. in an atmosphere in which 5% by mol of hydrogen gas was mixed for 8 hours.

2 g of the prepared $LiFePO_4$ cathode material, 0.11 g of carbon black (Denka Black) as a conductive agent, 0.11 g of polyvinylidenefluoride (PVdF) as a binder, and a predetermined amount of NMP were mixed to adjust the viscosity to about 2,000 cps, which is a value at which the mixture can be easily coated on the aluminum current collector, and then the mixture was stirred at a high rate of 5,000 rpm for 40 minutes using a homogenizer.

The stirred slurry was coated to a thickness of 80 μm on an aluminum current collector having a thickness of 15 μm using a doctor blade method, and then dried. The dried $LiFePO_4$ was rolled to a thickness of 30 μm using a roller to prepare a cathode.

The cathode and a lithium metal anode having a thickness of 150 μm were stacked, a polypropylene separator film was disposed between the two electrodes, an electrolyte solution produced by dissolving 1 M of $LiPF_6$ lithium salt in an organic solvent in which ethylene carbonate/diethyl carbonate/dimethyl carbonate were mixed in a volume ratio of 1:1:1 was injected thereinto, and then a battery in the form of a CR2032 coin was assembled.

Example 2

Crystalline $FePO_4 \cdot 2H_2O$ (metastrengite), a cathode material, and a battery were manufactured in the same manner as in Example 1, except that the acid base titration was adjusted to a pH of 2.0 during the preparation of the crystalline $FePO_4 \cdot 2H_2O$ (metastrengite).

Evaluation

An X-ray analysis was performed in order to confirm the phase of materials prepared in Examples 1 and 2, and the cathode materials prepared in Examples 1 and 2 were observed with a scanning electron microscope (SEM). In addition, in order to confirm the performance of cathodes fabricated in Examples 1 and 2, a capacity and cycle test was performed using a constant current method.

Figure 2:
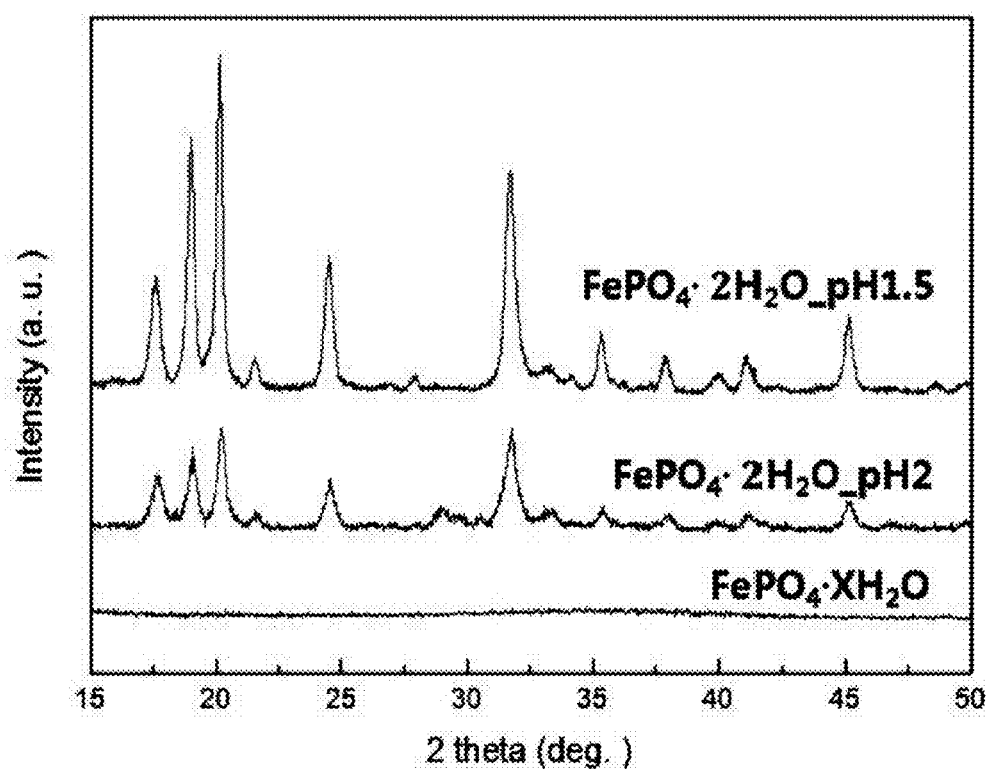
FIG. 2 is an X-ray diffraction analysis result of amorphous $FePO_4 \cdot XH_2O$ and crystalline $FePO_4 \cdot 2H_2O$ (metastrengite)

FIG. 2 illustrates an X-ray diffraction analysis result of $FePO_4 \cdot XH_2O$ and $FePO_4 \cdot 2H_2O$ (metastrengite), which were synthesized in Examples 1 and 2. Referring to FIG. 2, it can be confirmed that $FePO_4 \cdot 2H_2O$ (metastrengite) (Example 1) synthesized in a condition of a pH of 1.5 had higher crystallinity and purity than $FePO_4 \cdot 2H_2O$ (metastrengite) (Example 2) synthesized in a condition of a pH of 2.0.

Figure 3A:
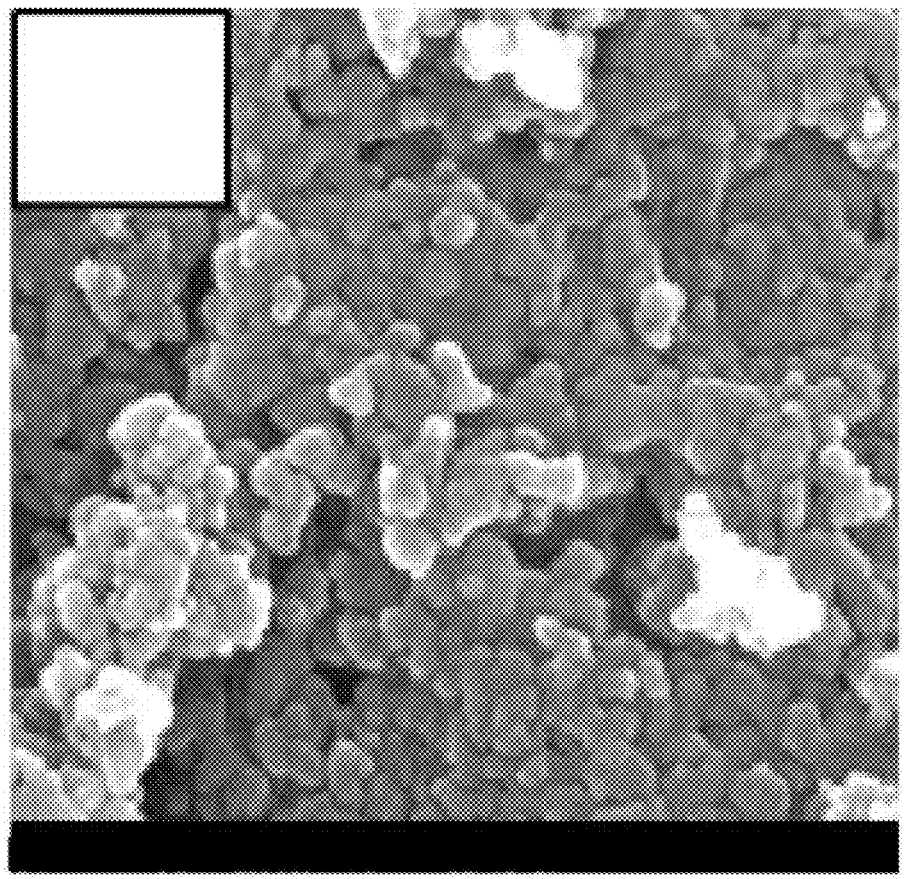
FIG. 3A is a scanning microscope photograph of $FePO_4 \cdot XH_2O$ synthesized in Example 1.
Figure 3B:
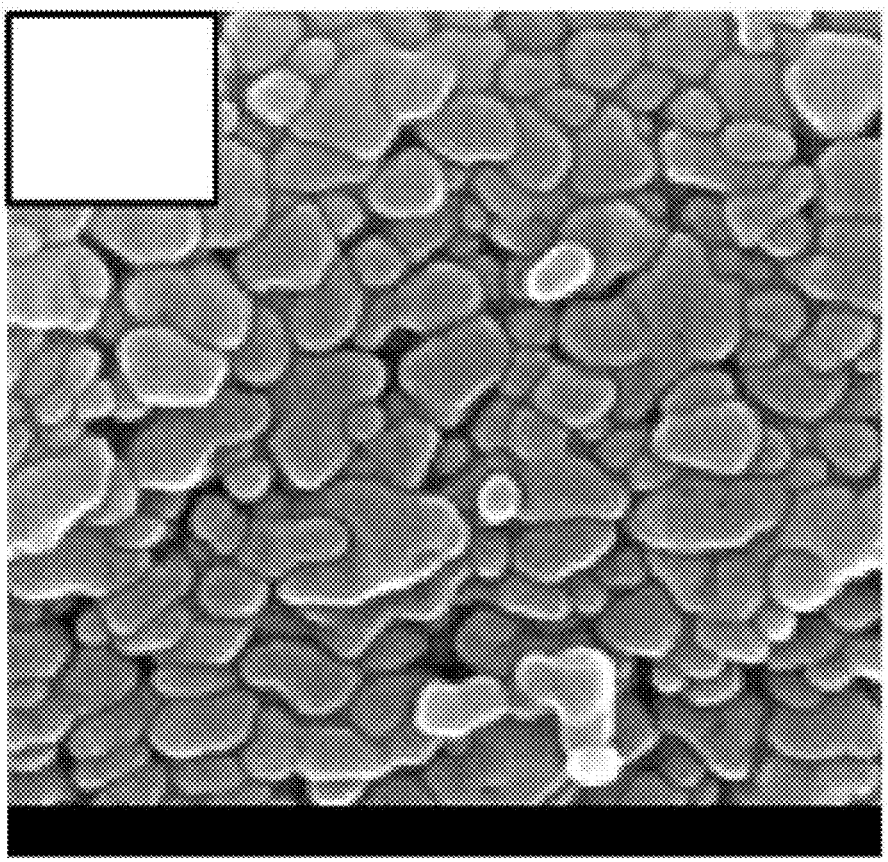
FIG. 3B is a scanning microscope photograph of $FePO_4 \cdot 2H_2O$ (metastrengite) synthesized under pH 2.0 in Example 2.
Figure 3C:
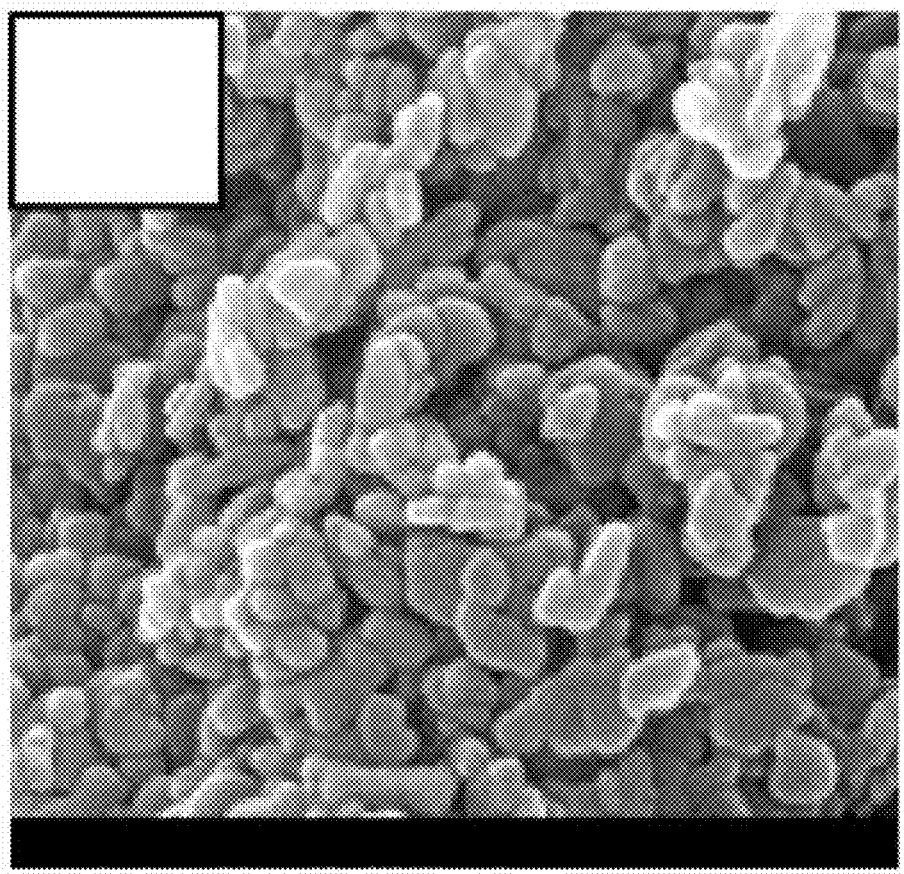
FIG. 3C is a scanning microscope photograph of $FePO_4 \cdot 2H_2O$ (metastrengite) synthesized under pH 1.5 in Example 1.

FIG. 3A illustrates a scanning microscope photograph of $FePO_4 \cdot XH_2O$ synthesized in Example 1. FIG. 3B illustrates a scanning microscope photograph of $FePO_4 \cdot 2H_2O$ (metastrengite) synthesized under pH 2.0 in Example 2. FIG. 3C illustrates a scanning microscope photograph of $FePO_4 \cdot 2H_2O$ (metastrengite) synthesized under pH 1.5 in Example 1. Referring to FIG. 3A, it can be confirmed that $FePO_4 \cdot XH_2O$ in the amorphous phase has irregular shapes and particles are aggregated together. Referring to FIG. 3B, $FePO_4 \cdot 2H_2O$ (metastrengite) synthesized in a condition of a pH of 2.0 had spherical particles, and the particles were uniformly distributed with a size of about 100 nm (Example 2). Referring to FIGS. 3B and 3C, $FePO_4 \cdot 2H_2O$ (metastrengite) (Example 1) synthesized in a condition of a pH of 1.5 had irregular shapes, but smaller sizes than $FePO_4 \cdot 2H_2O$ (metastrengite) (Example 2) synthesized in a condition having a pH of 2.0.

Figure 4:
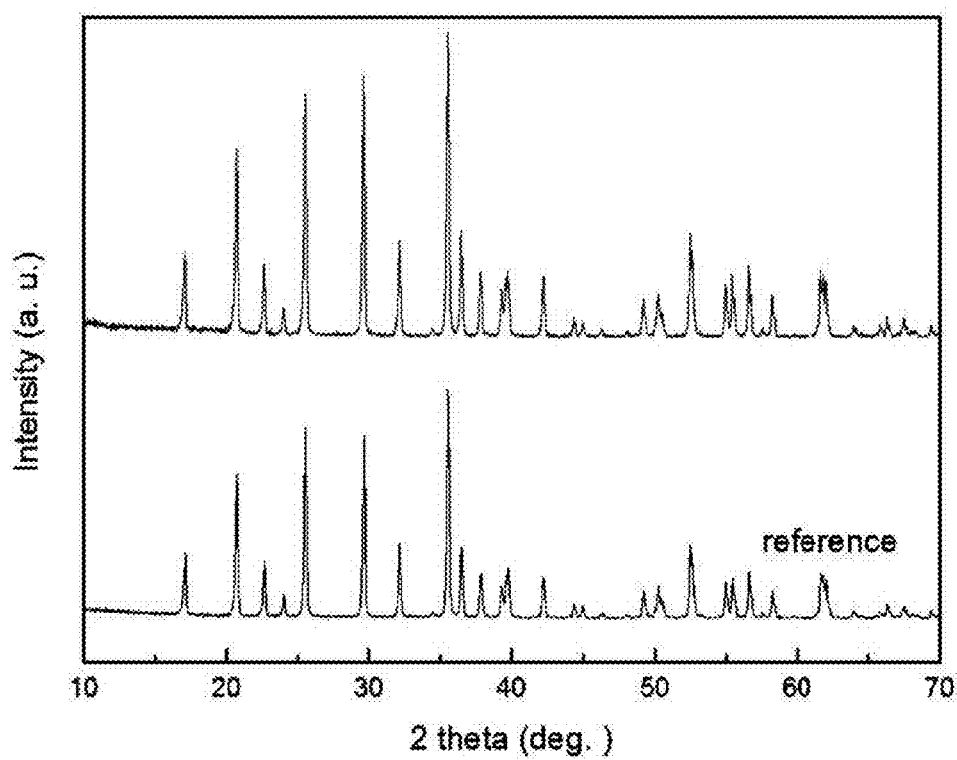
FIG. 4 is an X-ray diffraction analysis result of the $LiFePO_4$ cathode material according to Example 1.

FIG. 4 illustrates an X-ray diffraction analysis result of the $LiFePO_4$ cathode material synthesized according to Example 1. Referring to FIG. 4, it can be confirmed that peaks of the $LiFePO_4$ cathode material synthesized according to Example 1 coincide with those of the original $LiFePO_4$ cathode material (reference) in which the cathode scraps were not recycled. Therefore, it can be confirmed that when the cathode scraps were recycled according to the present invention, a phase equivalent to that of the original $LiFePO_4$ could be synthesized.

Figure 5A:
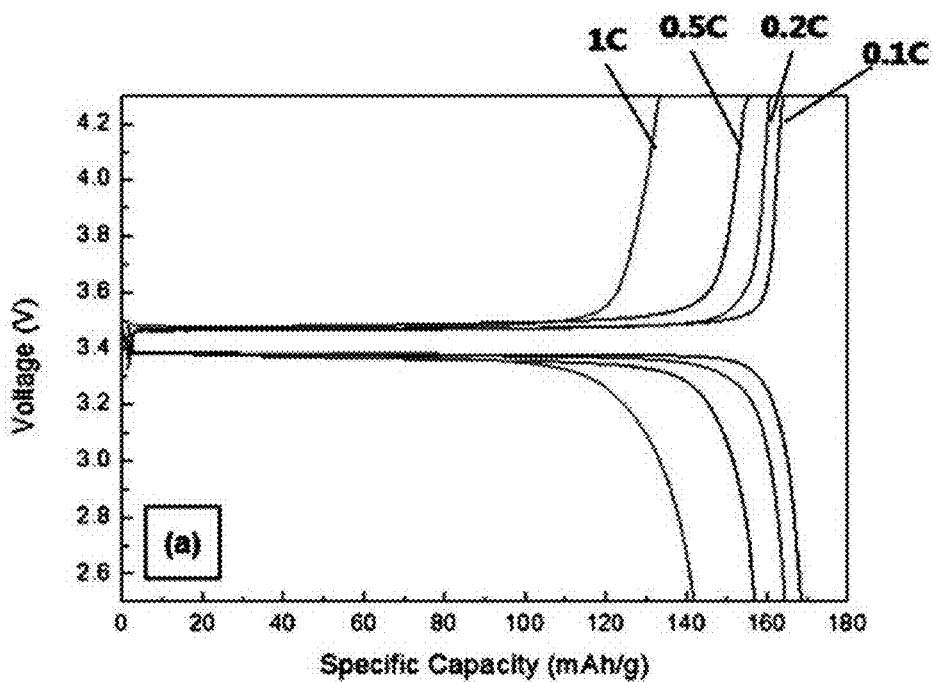
FIG. 5A is a graph illustrating charge and discharge characteristics of a lithium secondary battery manufactured using the $LiFePO_4$ cathode material according to Example 1.
Figure 5B:
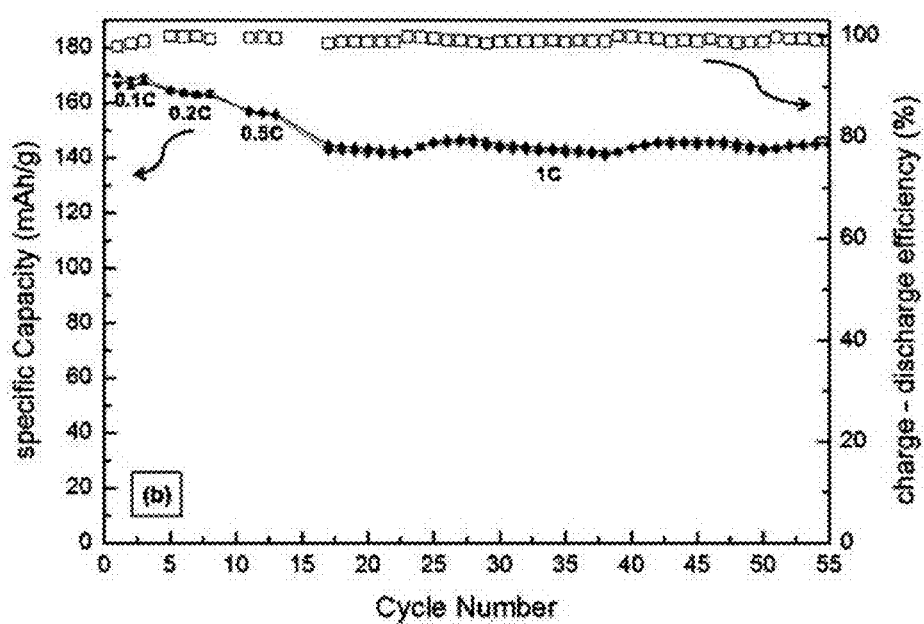
FIG. 5B is a graph illustrating cycle characteristics of a lithium secondary battery manufactured using the $LiFePO_4$ cathode material according to Example 1.

FIG. 5A illustrates a voltage curve according to the charge and discharge characteristics of the $LiFePO_4$ cathode material synthesized in Example 1. FIG. 5B illustrates a cycle characteristics of the $LiFePO_4$ cathode material synthesized in Example 1. Referring to FIGS. 5A and 5B, it can be confirmed that in a condition of 0.1 C, the charge/discharge capacities showed 169 mAh/g and 167 mAh/g, respectively, which was equivalent to 99% cycle efficiency, and even in conditions of 0.2 C, 0.5 C, and 1 C, stable cycle characteristics were shown without a sharp decrease in capacity.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for recycling an olivine-based cathode material for a lithium secondary battery, the method including:
   a first step of recovering a cathode material comprising $LiFePO_4$ from lithium secondary battery cathode scraps;
   a second step of synthesizing amorphous $FePO_4 \cdot XH_2O$ using the recovered cathode material; and
   a third step of synthesizing crystalline $FePO_4 \cdot 2H_2O$ using the amorphous $FePO_4 \cdot XH_2O$.

2. The method of claim 1, further comprising a fourth step of synthesizing a cathode material comprising $LiFePO_4$ using the crystalline $FePO_4 \cdot 2H_2O$ after the third step.

3. The method of claim 2, wherein, in the fourth step, the cathode material comprising LiFePO4 is synthesized by mixing a lithium source material and a carbon source material with the crystalline $FePO_4 \cdot 2H_2O$ and subjecting the mixture to heat treatment.

4. The method of claim 3, wherein the crystalline FePO4.2H2O and the lithium source material are mixed such that a molar ratio of Fe to Li is 1:1, and the heat treatment is performed in a reducing atmosphere or inert atmosphere.

5. The method of claim 3, wherein the lithium source material comprises one or more selected from the group consisting of $LiOH \cdot H_2O$, $Li_2CO_3$, $LiCl$, $Li_3PO_4$, and a combination thereof.

6. The method of claim 3, wherein the carbon source material comprises one or more selected from the group consisting of carbon black, acetylene black, sucrose, and a combination thereof.

7. The method of claim 3, wherein the carbon source material is added in an amount of 1 to 10% by weight based on a weight of the finally produced $LiFePO_4$ cathode active material.

8. The method of claim 3, wherein the heat treatment is performed at 500° C. to 800° C. for 6 to 24 hours.

9. The method of claim 1, wherein, in the first step, the cathode material is recovered from the cathode scraps by subjecting the cathode scraps to heat treatment in an oxidizing atmosphere and then removing a current collector.

10. The method of claim 9, wherein the heat treatment is performed at a temperature of 300° C. to 500° C.

11. The method of claim 1, wherein, in the second step, amorphous $FePO_4 \cdot XH_2O$ is synthesized by dissolving the recovered cathode material in an acid and then injecting ammonia water into the solution to precipitate amorphous $FePO_4 \cdot XH_2O$, and the amorphous $FePO_4 \cdot XH_2O$ is separated through a filtration process.

12. The method of claim 11, further comprising oxidizing Fe present in the cathode material by subjecting the recovered cathode material to heat treatment before the recovered cathode material is dissolved in the acid.

13. The method of claim 12, wherein the heat treatment is performed at 700° C. to 900° C.

14. The method of claim 11, wherein the acid comprises one or more selected from the group consisting of nitric acid, hydrochloric acid, sulfuric acid, and a combination thereof.

15. The method of claim 11, wherein the second step is performed by adding ammonia water to the solution to adjust the pH to 5 to 6 and maintaining the solution at 20° C. to 70° C. for 1 to 12 hours.

16. The method of claim 1, wherein the third step is performed by synthesizing crystalline $FePO_4 \cdot 2H_2O$ by treating amorphous $FePO_4 \cdot XH_2O$ with an acid solution having a pH of 1 to 2.

17. The method of claim 16, wherein the acid solution comprises a phosphoric acid solution.

18. The method of claim 17, wherein a concentration of the phosphoric acid solution is 5 mol/l.

* * * * *